United States Patent
Gantz

Patent Number: 5,579,759
Date of Patent: Dec. 3, 1996

[54] APPARATUS AND METHOD FOR AEROSOL MEDICATION MEASUREMENT

[76] Inventor: Everett Gantz, P.O. Box 15487, Long Beach, Calif. 90815

[21] Appl. No.: 536,744

[22] Filed: Sep. 29, 1995

[51] Int. Cl.$^6$ ................................................. G01F 22/00
[52] U.S. Cl. ...................... 128/200.24; 73/426; 177/207
[58] Field of Search ....................... 128/200.23, 200.24; 73/52, 149, 426; 222/154; 215/365; 116/DIG. 32; 206/828; 604/404; 177/207

[56] References Cited

U.S. PATENT DOCUMENTS

| | | | |
|---|---|---|---|
| 607,010 | 7/1898 | Baumann | 177/207 |
| 2,132,015 | 10/1938 | Collins | 73/450 |
| 3,505,870 | 4/1970 | Smylie | 222/158 |
| 3,687,209 | 8/1972 | Goldberg et al. | 222/77 |
| 4,630,481 | 12/1986 | Bergstrom et al. | 73/437 |
| 4,876,891 | 10/1989 | Felt et al. | 73/426 |

OTHER PUBLICATIONS

Air Currents, vol. 3, No. 2, Mar./Apr. 1992, p. 7.
Instructions for Inspirease By Schering Corporation, Copyright 1990.

*Primary Examiner*—V. Millin
*Assistant Examiner*—Eric P. Raciti
*Attorney, Agent, or Firm*—Charles H. Thomas

[57] ABSTRACT

An apparatus is provided for ascertaining whether or not the contents of an aerosol medication inhaler canister are near depletion. The apparatus is comprised of a tank having transparent walls and a reference indicia on the tank visible through a transparent front wall panel. The reference indicia depicts the orientation of the longitudinal axis of an empty aerosol medication inhaler canister floating in water relative to horizontal. Preferably, the reference indicia is mounted on a dial attached to the rear wall of the tank. The dial includes a pointer. Canister model code marks are printed on the rear wall of the tank immediately beneath the dial. The user rotates the dial to align the pointer with the particular model code mark corresponding to the canister model the user wishes to measure. This brings the reference indicia on the dial into the fully discharged orientation which an empty canister of that model will assume when placed in water. The tank is then filled with water to the fill line and the canister to be measured in placed in the water. The user thereupon visually observes the orientation which the canister assumes in the tank and visually compares that orientation with the reference indicia to ascertain how close the canister is to a fully discharged condition.

13 Claims, 2 Drawing Sheets

APPARATUS AND METHOD FOR AEROSOL MEDICATION MEASUREMENT

BACKGROUND OF THE INVENTION

1. Field of the Invention

The present relates to an apparatus and method for measuring the amount of aerosol medication remaining in an aerosol medication inhaler canister and for estimating the number of charges remaining therein.

2. Description of the Prior Art

A significant number of human beings suffer from a bronchial condition known as asthma. Asthmatic persons suffer from a paroxysmal disorder of respiration and at times experience labored breathing and a feeling of constriction in the chest. This condition is caused by an inflammation of bronchial tissues which constricts the air passageways in and to the lungs.

To provide temporary relief for an asthmatic condition, medication must be applied promptly. Such medication has for many years been provided through an inhaler which receives a measured charge of the medication from a canister and atomizes the medicinal charge as it is orally inhaled so that the medication is immediately applied to the inflamed tissues. The metered charges of medication are received through a mouthpiece coupled to a hollow metal or plastic canister which contains the medication. Such canisters are sold as prescription items and typically contain about 200 metered charges.

While asthma medication applied through an inhaler does provide the necessary temporary relief for a patient, long standing defects have existed in the container system for asthma medication. Specifically, a patient really has no means for determining how much medication is left in an aerosol medication inhaler canister. Since the canister contains numerous charges, it is impractical for a patient to attempt to keep track of the number of charges that have already been utilized from a canister. Furthermore, the exact number of charges in a canister will vary in any event.

As a consequence, a patient heretofore has had no systematic way of determining when the medication contents of an aerosol medication inhaler canister are nearly depleted, or indeed already have been depleted. Indeed, a patient is often only alerted to the fact that a canister is empty when utilization of it fails to provide relief from an asthma attack. Unless the patient has a refill canister readily available, the patient can be exposed to a very dangerous condition, and in any event is likely to experience considerable discomfort until a replacement canister has been fitted onto the inhaler mouthpiece and a charge of medication has been elicited therefrom.

To avoid becoming entrapped in a situation in which no medication is readily available, a patient is likely to discard and replace an aerosol medication canister prematurely when it is believed to be approaching a depleted condition, even though the original canister may contain a number of further metered charges. This is both wasteful and expensive, since refill cartridges are quite costly. Moreover, if a patient were aware of the approaching depletion of an aerosol medication canister, the patient would be in a position to purchase a replacement canister at the patient's convenience from a low cost or price discount source of supply, rather than being forced to spend a much larger amount in order to procure a refill canister under emergency conditions.

A further disadvantage of aerosol medication container systems is that sometimes the medication is depleted before the aerosol propellant. Under such circumstances a patient continues to activate the canister so as to deliver a charge of medication, but only receives a charge of the aerosol propellent. Thus, the patient is exposed to considerable discomfort until the patient realizes that the canister is no longer effective and that a replacement canister must be employed.

For some time it has been recognized that as inhaler canisters discharge their medication, the weight of the canister decreases. If a full canister is placed in a volume of water, it will sink to the bottom of the container. As the medication is depleted, the canister, if again placed in water, will tend to float at the surface of the water at an orientation corresponding to its state of depletion. Exemplary conditions of an aerosol medication canister in different states of depletion are illustrated at page 7 of the publication AIR CURRENTS, Volume 3, Number 2, March/April, 1992. However, heretofore there has been no system that allows a user to utilize this information in a systematic way so as to accurately measure the state of depletion of an aerosol medication canister.

Moreover, there are a considerable number of different models of canisters and a number of different manufacturers of aerosol medication canisters, each employing a canister of a slightly different configuration. As a consequence, the different models of canisters produced by various manufacturers will float at different orientations when empty. Therefore, there has heretofore been no universal system that allows a user to measure the state of depletion of different models of canisters utilizing a uniform procedure.

SUMMARY OF THE INVENTION

A primary object of the present invention is to provide a system to accurately and consistently measure the state of depletion of an aerosol canister for delivering asthma medication to an asthmatic patient. The present invention provides an apparatus which not only allows a user to observe the attitude of flotation of an aerosol medication canister in water, but an apparatus which also provides an unequivocal reference indicia against which the patient can accurately gauge the state of depletion of the canister being measured. The present invention allows a user to measure the medication remaining in a canister without running the risk of inadvertently running out of medication.

A related object of the invention is to provide a system that enables a patient to utilize the nearly entire contents of an aerosol medication canister without discarding a significant, unused portion of it prior to depletion of the canister contents. This has often been the practice of asthma sufferers due simply to the absence of a reliable measuring system. The medication measurement system of the invention allows a patient to fully utilize nearly all of the medication remaining in a canister while avoiding the risk of running out of medication unexpectedly.

A further object of the invention is to provide an asthmatic patient with a system for measuring the approaching depletion of medication in an asthma medication aerosol canister so as to take advantage of value opportunities in purchasing canister refills. Indeed, a patient utilizing the system of the invention can even perform the measurement in an establishment at which refill canisters are offered for sale. This allows a patient to prudently take advantage of buying opportunities, without unnecessarily expending money for excessive stockpiling of replacement canisters.

A further object of the invention is to provide a system that allows a patient to accurately measure the amount of medication remaining in different models of aerosol canisters produced by different manufacturers using a single device and method. The system of the invention is highly versatile for use with numerous commercially available aerosol medication canisters, yet is extremely uncomplicated in design.

In one broad aspect the present invention may be considered to be an apparatus for ascertaining whether or not the contents of an aerosol medication inhaler canister are near depletion. The apparatus is comprised of a tank having at least one transparent, vertical panel, and a reference indicia in the tank visible through the transparent, vertical panel indicating the orientation of the longitudinal axis relative to horizontal of an empty aerosol medication inhaler canister floating in water. By providing a reference indicia on the actual tank in which the canister is placed for measurement, a user is able to much more accurately ascertain the state of discharge of the canister floating in water than is possible by attempting to compare the orientation of the canister to be measured with a mentally recalled image of the orientation of a corresponding depleted floating canister. Moreover, the reference indicia can be positioned in such a way on the tank so that the user can visually compare the canister to be measured with the reference indicia while viewing both at the same time.

In another broad aspect the invention may be considered to be a device for measuring the amount of aerosol medication left in an aerosol medication inhaler canister. The device is comprised of a tank formed with a vertical, transparent front wall and a reference indicia on the tank visible from the front wall and indicative to the longitudinal orientation that an empty aerosol medication inhaler canister assumes when floating in water.

In a preferred embodiment of the invention fill level indicia are defined on the tank to indicate a suggested level to which the tank should be filled with water. Also, the reference indicia is located at a vertical level on the tank so that an empty canister floating in water in the tank resides in vertical alignment with the reference indicia. As a result, a user can look through the front wall of the tank and compare both the level and orientation of the canister being measured with the level and orientation of the reference indicia. The more closely the level and orientation of the canister being measured matches that of the reference indicia, the more nearly fully discharged is the canister being measured.

Preferably, the apparatus of the invention is constructed so as to be able to measure different models and sizes of aerosol medication canisters produced by different manufacturers. Although virtually all such commercially available canisters have the same general appearance, each such canister has a slightly different configuration and weight. The differences in weight and configuration of the canisters produce significant differences in the orientation that a commercially available canister will assume when empty and floating in water. As a consequence, a particular orientation for one model of canister produced by one manufacturer may indicate the canister is empty, while a different model or size of canister produced by the same or a different manufacturer may assume the same orientation even though it still contains a significant amount of medication.

In order to allow the apparatus of the invention to be utilized with different models of canisters and canisters produced by a number of different manufacturers, the reference indicia is preferable rotatable relative to the tank and indexed according to the particular model of the canister being measured.

Preferably the tank has a transparent rear wall with a disk-shaped dial mounted externally thereon. The disk-shaped dial bears the reference indicia at its center and has a pointer or index indicia defined at the periphery of the disk-shaped dial. The tank is further provided with canister model code marks on the rear wall at the periphery of the dial. In this way alternative alignment of the pointer indicia of the dial with each of the canister model code marks brings the reference indicia to an orientation relative to horizontal that is characteristic of the longitudinal orientation of a discharged, floating canister of a particular model and produced by a particular manufacturer identified with the model code mark selected.

Preferably also the reference indicia is a representation of a picture or outline of an aerosol medication inhaler canister. This facilitates a visual comparison of the canister being measured with the orientation that the same model canister will assume when fully discharged and floating in water.

In still another broad aspect the invention may be considered to be a method of measuring the amount of aerosol medication left in an aerosol medication inhaler canister. The method is performed utilizing a tank formed with a vertical, transparent front wall and a reference indicia on the tank visible from the front wall of the tank and indicative of the longitudinal orientation that an empty aerosol medication inhaler canister assumes when floating in water. The steps of the method of the invention involve filling the tank with water, placing an aerosol medication inhaler canister in the water in the tank, visually observing through the front wall the orientation which the canister assumes in the tank, and visually comparing the orientation which the canister assumes with the reference indicia to ascertain whether or not the canister is approaching a discharged condition.

In the preferred practice of the method the tank has a transparent back wall with a disk-shaped dial bearing the reference indicia and an index mark mounted thereon. The tank also has a plurality of canister model code marks on the back wall with which the index mark is selectively and alternatively alignable. The user rotates the dial to bring the index mark thereon into registration with a single one of the canister model code marks on the back wall prior to performing the steps of visually observing and comparing.

The invention may be described with greater clarity and particularity by reference to the accompanying drawings.

DESCRIPTION OF THE EMBODIMENT AND IMPLEMENTATION OF THE METHOD

Figure 1:
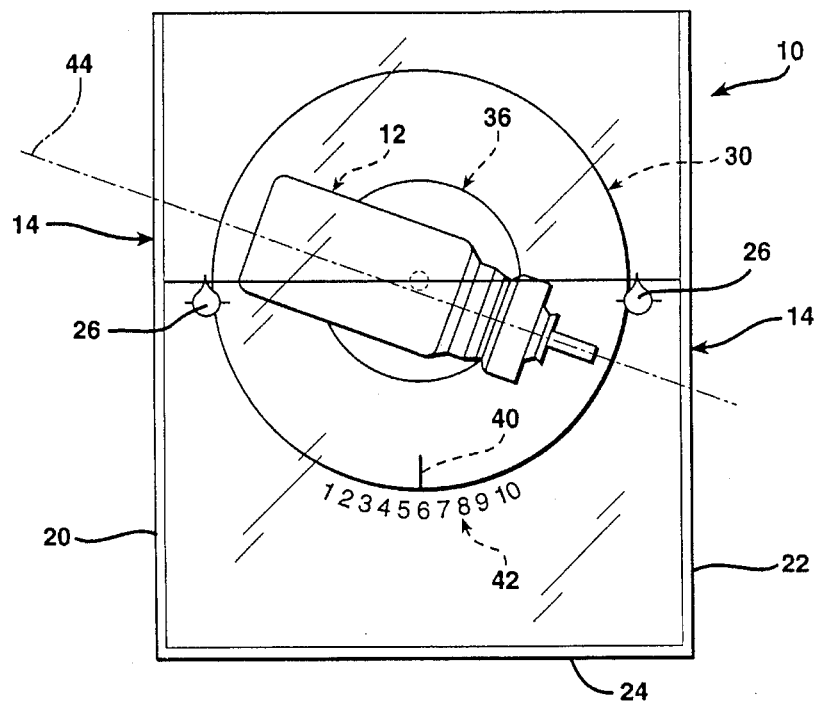
FIG. 1 is a front elevation view illustrating a preferred embodiment and implementation of the invention.
Figure 2:
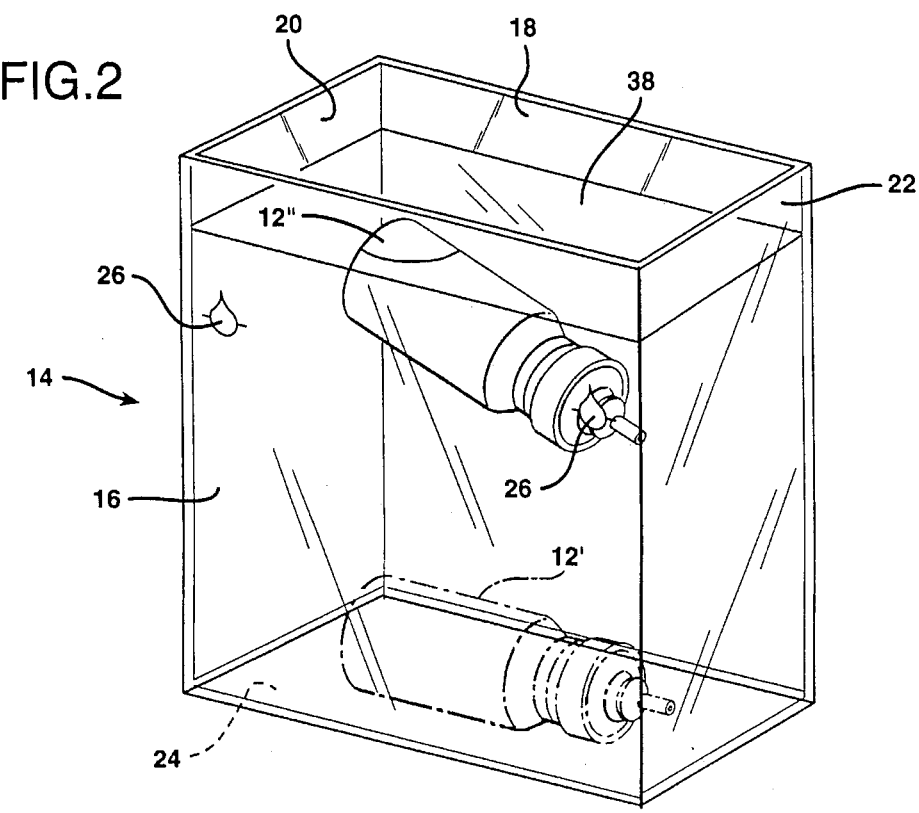
FIG. 2 is a perspective view illustrating the tank shown in FIG. 1 prior to application of the reference indicia thereto.
Figure 3:
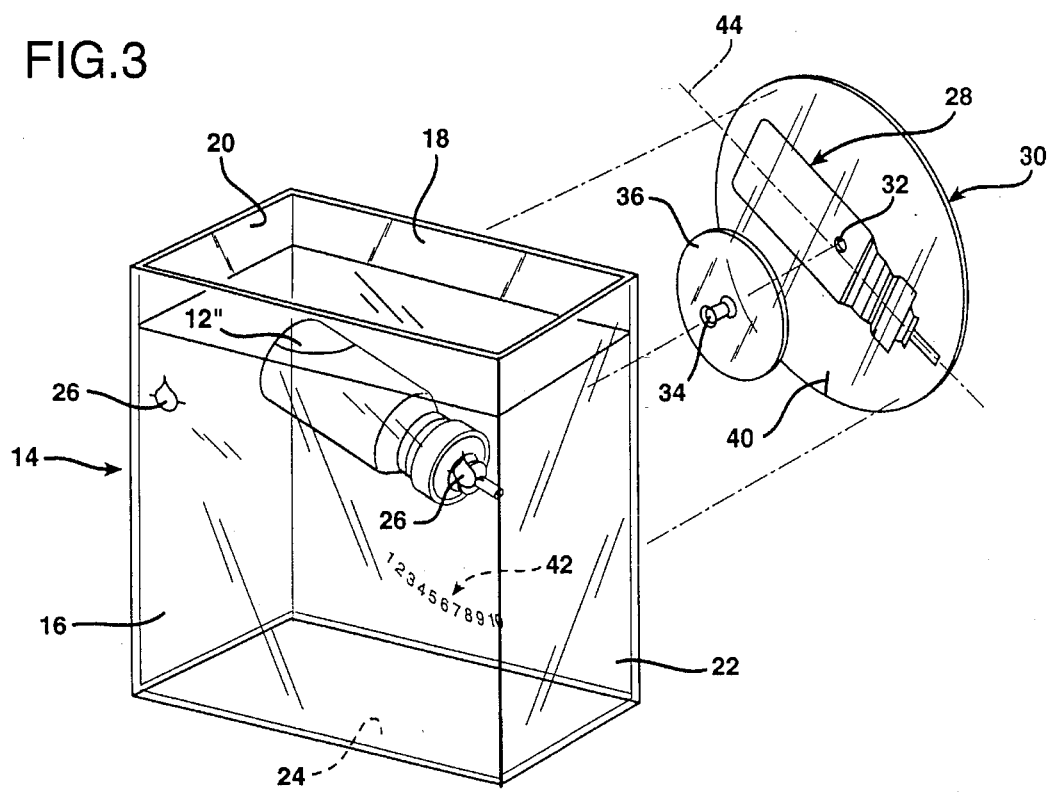
FIG. 3 is an exploded perspective view of the apparatus of FIG. 1.

FIG. 1 illustrates an apparatus indicated generally at 10 for ascertaining whether or not the contents of an aerosol medication inhaler canister 12, are near depletion. The apparatus 10 is comprised of a tank 14, formed in the shape of a rectangular prism as best shown in FIGS. 2 and 3. The tank 14 is constructed of transparent, rectangular panels of a water impervious plastic, such as an acrylic resin polymethyl methacrylate sold under the registered trademark Lucite.

The structure of the tank 14 includes a transparent front panel 16, a transparent rear panel 18, transparent side panels 20 and 22, and a transparent bottom panel 24. These panels are glued together with watertight adhesive along their adjoining edges. The front and rear panels 16 and 18, respectively, are each three inches wide and four inches high. The side panels 20 and 22 are each preferably one inch wide and four inches high. The bottom panel 24 is preferably three inches wide by one inch deep. All suggested dimensions are measured along the exterior edges of the panels. Each of the panels may, for example, be between one-eighth of an inch and one-quarter of an inch in thickness. The top of the tank 14 is open. The canister 12 is typically about seven-eighths of an inch in diameter and about two and one-half inches long.

The front panel 16 includes fill level indicia 26, which in the embodiment illustrated appear as pictures of drops of water with short lines extending horizontally therefrom on both sides. The indicia 26 are located near the opposite side edges of the front panel 16, proximate the side panels 20 and 22. The fill level indicia 26 are both located at the same elevation, for example about two and one-quarter inches, above the level of the bottom panel 24. The fill level indicia 26 may be provided in the form of decals affixed to the exterior surface of the vertical, transparent front panel 16, or they may be inscribed into the front panel 16.

Figure 4:
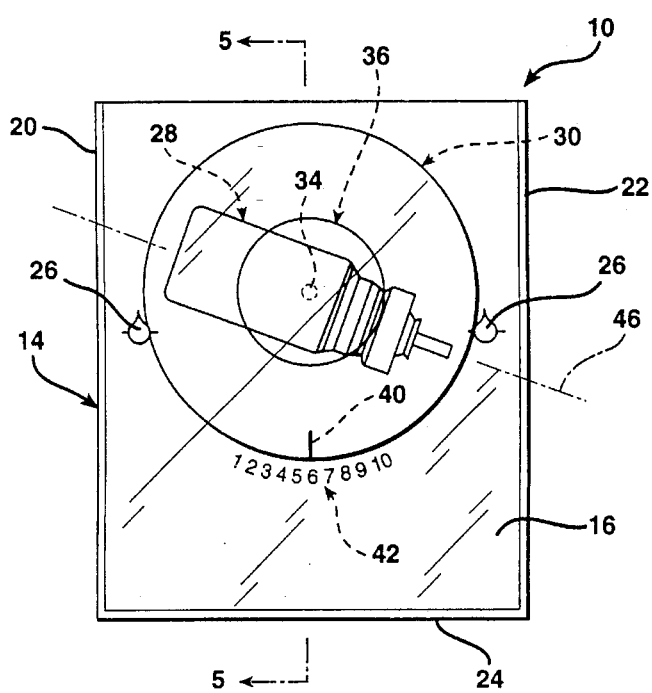
FIG. 4 is a front elevational view of the apparatus of FIG. 1 shown without a canister to be measured.
Figure 5:
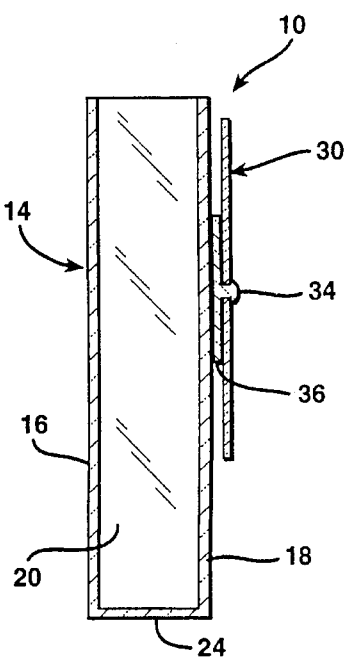
FIG. 5 is a sectional elevational view taken along the lines 5—5 of FIG. 4.

The device 10 also includes a reference indicia 28, which in the embodiment illustrated is an artistic rendering of an aerosol medication inhaler canister 12. As best shown in FIG. 4, the reference indicia 28 is visible from the front wall panel 16 of the tank 14 and is indicative of the longitudinal orientation that an empty aerosol medication inhaler canister 12 assumes when floating in water. The reference indicia 28 indicates the orientation of the longitudinal axis of an empty aerosol medication inhaler canister 12 floating in water relative to horizontal. The longitudinal axis of the reference indicia 28 is indicated at 46 in FIG. 4.

While the reference indicia 28 may be formed directly on the rear panel 18, preferably the apparatus 10 is further comprised of a disk-shaped, transparent, plastic dial 30 about three inches in diameter. The reference indicia 28 may take the form of screen printing directly onto either surface of the rotatable, plastic dial 30 such that the center of the artistic rendering of the reference indicia 28 resides at the center of the disk 30. An aperture 32 is defined through the center of the disk 30 so as to receive the head of a rivet 34 therethrough. The rivet 34 also extends through a smaller transparent plastic mounting disk 36, preferably about one and a half inches in diameter. Both the dial 30 and the smaller disk 36 may be formed on the same plastic material as the walls and bottom panels of the tank 14. The dial 30 is preferably about one-sixteenth of an inch in thickness while the mounting disk 36 is preferably about one-eighth of an inch in thickness.

The end of the rivet 34 opposite the head that protrudes through the disk 30 is seated in a countersunken opening through the center of the mounting disk 36. The head of the rivet 34 holds the rotatable dial disk 30 in face-to-face relationship with the mounting disk 36, but permits rotation of the rotatable disk 30 relative to the mounting disk 36. Use of the intermediate mounting disk 36 avoids any penetration of the rear wall 18 by the rivet 34.

In the assembly of the apparatus 10, the forwardly facing surface of the mounting disk 36 is secured to the exterior surface of the transparent rear panel 18 by an adhesive. The mounting disk 36 is attached to the exterior of the rear wall 18 above the center thereof so that when the tank 14 is filled with water 38 to the level of the horizontal lines of the fill level indicia 26, and an empty aerosol medication inhaler canister 12 is placed in the tank 14, the reference indicia 28 resides at a vertical level on the tank 14 so that the empty canister 12 floating in the water 38 resides in vertical alignment with the reference indicia 28 as illustrated in FIG. 1.

Beneath the reference indicia 28, the rotatable disk 30 also bears a pointer indicia in the form of a short, straight line 40 extending radially inwardly toward the center of the disk 30 at the periphery thereof. Also, the rear wall panel 18 additionally includes canister model code marks which in the embodiment depicted are in the form of the numbers one through ten, which are collectively indicated at 42. Nonnumerical indicia, such as bars, bullets, etc. could be employed in place of the numerical indicia shown. These canister model code marks 42 are arranged in an arcuate array just beneath the level of the dial 30 beyond the periphery thereof.

Each of the numbers one through ten in the canister model code mark array 42 corresponds to a different model or manufacturer of an aerosol medication inhaler canister that is commercially available. The identification of the manufacturers and/or canister model numbers associated with each of the numbers in the manufacturer code mark array 42 may be provided to the user with written instructions for the use of the apparatus 10. Since there are only a limited number of different models of aerosol medication inhaler canisters commercially available, the user will have no difficulty in memorizing the particular number in the reference code mark array 42 with which the pointer indicia 40 should be aligned for use with the particular model of medication canister 12 being utilized. The array 42 of canister model code marks may be applied to the exterior surface of the transparent rear panel 18 in the form of a decal.

The dial 30 can be manually turned about the rivet 34 so as to alternatively align the pointer indicia 40 with each of the numbers in the array of the canister model code marks 42. Rotation of the dial 30 in this manner brings the reference indicia 28 to an orientation relative to horizontal that is characteristics of the longitudinal orientation of a discharged floating canister 12 of a particular model and produced by a manufacturer identified with the model code mark selected from the model code mark array 42.

FIG. 2 illustrates a tank 14 of the apparatus 10 shown in FIG. 1. FIG. 2 shows the tank 14 prior to the installation of the mounting disk 36 and dial 30 and is useful in explaining the intermediate positions which an aerosol medication inhaler canister 12 will assume when it is not empty.

When the tank 14 is filled with cool tap water 38 to the level of the horizontal lines of the fill indicia 26, an aerosol medication inhaler canister 12, when dropped into the water 38, will assume a number of different possible positions, depending upon the extent to which the medication therein has been depleted. If the canister 12 is filled with medication, the weight of the canister 12 and the contents thereof will cause the canister 12 to sink to the bottom of the tank 14 and rest on the bottom panel 24 as indicated in phantom at 12' in FIG. 2. Naturally, when the canister 12 is immersed in the water 38, it will displace its volume, thus raising the level of the water 38 above the fill level indicia 26.

If a significant portion of the medication in the canister 12 has been discharged through use by an asthma sufferer, the weight of the contents of the canister 12 will be reduced. In such a condition, the canister 12 will float mostly submerged and at an attitude or orientation indicated at 12" in FIGS. 2 and 3.

On the other hand, if the canister 12 is totally discharged of medication, and if the pointer indicia 40 has been aligned with the proper number corresponding to that particular canister model in the canister code array 42, and if the tank 14 is initially filled with water to the level of the horizontal lines in the fill level indicia 26 before the canister 12 is placed in the tank 14, the canister 12 will float directly in front of and actually obscure the artistic rendering of a canister in the reference indicia 28. FIG. 1 illustrates a fully discharged canister 12 floating directly in front of the reference indicia 28 and totally obscuring it from view.

According to the method of the invention the user first turns the dial 30 so as to selectively and alternatively align the pointer indicia 40 with the proper canister model code mark in the model code mark array 42 corresponding to the model of canister 12 to be measured. The different manufacturers and manufacturer model numbers of commercially available canisters are identified in printed operating instructions supplied with the apparatus 10.

In drawing FIGS. 1 and 4 the pointer indicia 40 has been aligned with the canister model code number "6". Once the proper alignment of the pointer indicia 40 with the appropriate canister model code number in the array 42 has been completed, the artistic rendition of the canister 12, namely the reference indicia 28, will reside at an orientation relative to horizontal which a fully discharged canister 12 will assume when placed in the tank 14 filled with water 38. That is, the longitudinal axis 44 of an actual, fully depleted canister 12, indicated in FIG. 1, will reside at the same angle relative to horizontal as the longitudinal axis 46 of the reference indicia 28, indicated in FIG. 4.

Once the tank 14 has been filled with water 38 to the fill level indicia 26, the canister 12 is placed therein. The nozzle of the canister 12 is directed in the same general direction as the nozzle depicted in the artistic rendering of the reference indicia 28, which is generally toward the side wall 22 of the tank 14 in the embodiment illustrated. The user then places the tank 14 at eye level and looks toward the reference indicia 28 through the transparent front wall panel 16. The user thereupon visually observes the orientation which the actual canister 12 assumes in the tank 14, and visually compares that orientation with the reference indicia 28 to ascertain whether or not the canister 12 is approaching a discharged condition.

If the canister 12 is not fully discharged, it will not totally obscure the reference indicia 28. For example, a canister nearing depletion will float in a position indicated at 12" in FIGS. 2 and 3. While a canister 12 in the position 12" will partially obscure the reference indicia 28 when observed through the front wall panel 16, it will not totally obscure the reference indicia 28 and its axis 44 will reside at a different orientation relative to horizontal than the axis 46 of the reference indicia 28. The closer the floating canister 12 is to congruent alignment with the reference indicia 28, the more nearly depleted is the condition of the canister 12. FIG. 1 illustrates a canister 12 from which all medication has been expelled.

Because of the high degree of accuracy in measurement obtainable using the present invention, it is possible to utilize a canister 12 down to the very final charge. A more prudent approach, however, is to discard the canister 12 once it closely approaches the orientation of the reference indicia 28. At the very least the user would be wise to have an extra, more completely charged canister 12 readily available when the measurement of orientation of a canister 12 closely approaches the fully discharged alignment depicted in FIG. 1.

Even if the user does discard the canister 12 shortly prior to complete discharge of the medication therein, the user is able to much more nearly completely and safely utilize the medication in the canister 12 than has heretofore been possible. Also, and in any event, the user is fully apprised of the imminent complete discharge of medication from the canister 12 and can procure refill canisters from the most economical source of supply with the advanced warning provided using the measurement device 10.

The present invention provides a system for accurately estimating the amount of medication remaining in an aerosol canister. The user is thereby able to minimize the waste that would otherwise occur by prematurely discarding canisters. The user is also able to avail himself or herself of opportunities for economical procurement of replacement aerosol medication inhaler canisters with the advance notice of the approaching necessity for replacement provided by the method and apparatus of the present invention.

Undoubtedly, numerous variations and modifications of the invention will become readily apparent to those familiar with aerosol medication inhalers. For example, the reference indicia need not necessarily take the form of an artistic rendering of a canister. It could just as easily be merely a straight line indicative of the alignment of the longitudinal axis of an empty canister floating in water. Also, the tank 14 could be formed of glass, rather than plastic, and could be injection molded as a unitary article, rather than being formed of components glued together. Other systems for mounting the dial 30 are entirely possible. Accordingly, the scope of the invention should not be construed as limited to the specific embodiment or implementation depicted and described.

What is claimed is:

1. In combination, an aerosol medication inhaler canister and apparatus for ascertaining whether or not the contents of said aerosol medication inhaler canister are near depletion comprising: a tank containing water therein and having at least one transparent, vertical panel and a reference indicia on said tank visible through said transparent, vertical panel and inclined relative to horizontal indicating the orientation of the longitudinal axis relative to horizontal of an empty aerosol medication inhaler canister floating in water, and wherein said aerosol medication inhaler canister is in said water in said tank and said canister and said reference indicia are located proximate each other and are concurrently visible together by an observer looking at said tank.

2. The combination according to claim 1 further comprising a fill level indicia on said tank whereby when said tank is filled to said fill level and an aerosol medication inhaler canister is placed therein, said canister, if empty, will float directly in front of said reference indicia at an orientation parallel thereto.

3. The combination according to claim 1 wherein said tank is formed as a rectangular prism in which said transparent panel forms a front wall and wherein said reference indicia is on an opposite, parallel rear wall.

4. The combination according to claim 3 wherein said rear wall is also transparent and further comprising a disk-shaped dial bearing said reference indicia thereon mounted for rotation relative to said rear wall, an index marker on the periphery of said dial, and a plurality of aerosol model indicia arranged on said rear wall proximate to said periphery of said dial, whereby rotation of said dial to bring said index marker into registration with a selected one of said model indicia carries said reference indicia to an orientation corresponding to alignment of an empty, floating canister of the model selected.

5. The combination according to claim 3 wherein said front and rear walls are joined by side panels that are one inch wide.

6. In combination, an aerosol medication inhaler canister and a device for measuring the amount of aerosol medication left in said aerosol medication inhaler canister comprising a tank containing water therein and formed with a vertical, transparent front wall and a reference indicia on said tank inclined relative to horizontal and visible from said front wall and indicative of the longitudinal orientation that an empty aerosol medication inhaler canister assumes when floating in water, and wherein said aerosol medication inhaler canister is in said water in said tank and said canister and said reference indicia are located proximate each other and are concurrently visible together by an observer looking at said tank.

7. A device according to claim 6 wherein said reference indicia includes a representation of an aerosol medication inhaler canister.

8. A device according to claim 6 further comprising fill level indicia on said tank to indicate a suggested level to which said tank should be filled with water.

9. A device according to claim 8 wherein said reference indicia is at a vertical level on said tank so that an empty canister floating in water in said tank resides in vertical alignment with said reference indicia.

10. A device according to claim 8 wherein said tank has a transparent back wall with a dial mounted externally thereon, and said dial bears said reference indicia at its center and a pointer indicia at its periphery, and further comprising canister model code marks on said rear wall of said tank at said periphery of said dial, whereby alternative, selective alignment of said pointer indicia with each of said canister model code marks brings said reference indicia to an orientation relative to horizontal that is characteristic of the longitudinal orientation of a discharged, floating canister of a model identified with the canister model code mark selected.

11. A method of measuring the amount of aerosol medication left in an aerosol medication inhaler canister utilizing a tank formed with a vertical, transparent front wall and a reference indicia on said tank inclined relative to horizontal and visible from said front wall of said tank and indicative of the longitudinal orientation that an empty aerosol medication inhaler canister assumes when floating in water comprising: filling said tank with water, placing an aerosol medication inhaler canister in said water in said tank, concurrently visually observing through said front wall said reference indica and the orientation which said canister assumes in said tank, and visually comparing the orientation which said canister assumes with said reference indicia to ascertain whether or not said canister is approaching a discharged condition.

12. A method according to claim 11 wherein said tank has a transparent back wall with a dial bearing said reference indicia and an index mark mounted thereon and said tank has a plurality of canister model code marks on said back wall with which said index mark is selectively and alternatively alignable, further comprising rotating said dial to bring said index mark thereon into registration with a single one of said canister model code marks on said back wall prior to said steps of visually observing and comparing.

13. A method according to claim 11 wherein said aerosol medication inhaler canister has a longitudinal axis and said reference indicia is on a planar, vertical surface of said tank, and further comprising laterally confining said aerosol medication inhaler canister so that said longitudinal axis thereof resides in a plane parallel to said planar, vertical surface.

* * * * *